United States Patent [19]

Schabacher et al.

[11] 4,150,102
[45] Apr. 17, 1979

[54] PURIFYING HYDROFLUORIC ACID

[75] Inventors: Werner Schabacher, Leverkusen, Fed. Rep. of Germany; Bernhard Spreckelmeyer, Johannesburg, South Africa

[73] Assignee: Bayer Aktiengesellschaft, Leverkusen, Fed. Rep. of Germany

[21] Appl. No.: 873,036

[22] Filed: Jan. 27, 1978

Related U.S. Application Data

[63] Continuation-in-part of Ser. No. 723,690, Sep. 16, 1976, abandoned.

[30] Foreign Application Priority Data

Oct. 2, 1975 [DE] Fed. Rep. of Germany ....... 2543965

[51] Int. Cl.$^2$ .............................................. C01B 7/22
[52] U.S. Cl. ...................................... 423/485; 423/488
[58] Field of Search ................................ 423/485, 488

[56] References Cited

U.S. PATENT DOCUMENTS

| | | | |
|---|---|---|---|
| 3,725,536 | 4/1973 | Gentili | 423/485 |
| 3,919,399 | 11/1975 | Schabacher et al. | 423/485 |
| 4,031,191 | 6/1977 | Burrus | 423/485 |

FOREIGN PATENT DOCUMENTS

| | | | |
|---|---|---|---|
| 34492 | 9/1971 | Japan | 423/485 |
| 1371790 | 10/1974 | United Kingdom | 423/485 |

Primary Examiner—Brian Hearn
Attorney, Agent, or Firm—Sprung, Felfe, Horn, Lynch & Kramer

[57] ABSTRACT

A process for the production of highly pure concentrated hydrofluoric acid by purifying crude HF gas containing $H_2O$, $SO_2$, $SiF_4$, S, $CaF_2$, $H_2SO_4$ and $CaSO_4$ and obtained in the reaction of fluorite and sulphuric acid, whereby the resultant HF has an $H_2SO_4$ content of the order of a few ppm, there are substantially no deposits of $CaSO_4$ in the first $H_2SO_4$ washing circuit and the service life of the system is considerably lengthened.

3 Claims, 2 Drawing Figures

PURIFYING HYDROFLUORIC ACID

This application is a continuation-in-part of application Ser. No. 723,690, filed Sept. 16, 1976, now abandoned.

This invention relates to an improved process for the production of highly pure, concentrated hydrofluoric acid and more especially for purifying the crude hydrogen fluoride gases evolved during the reaction of fluorite with sulphuric acid.

The starting materials used are, for example, acid-grade fluorite containing $\geq 97\%$ of $CaF_2$ and the water- and HF-containing charging acid with an $H_2SO_4$ content of about 90% which is obtained during purification of the crude gases. The crude HF gases evolved from the reaction system at temperatures of 200° C contain as their principal impurities water, sulphuric acid, sulphur dioxide, silicon tetrafluoride, inert gases and dust fractions, for example $CaSO_4$ and $CaF_2$. The dust fractions may be larger than normal providing the reactants are not combined in cold form, but instead hot fluorite with a temperature of approximately 500° C is reacted with hot charging acid with a temperature of approximately 100° C (for example in accordance with British Pat. No. 1,371,790).

British Pat. No. 1,414,748 describes a process for purifying and condensing the reaction gases in the production of hydrofluoric acid. In this process, the gases issuing from the reaction system with a temperature of 200° C are subjected in a first stage to countercurrent washing with concentrated $H_2SO_4$ heated to a temperature of from 50 to 120° C and are subsequently cooled to a temperature of from 60 to 130° C.

In one preferred embodiment of this known process, the preliminary $H_2SO_4$ wash is carried out as a two-stage countercurrent was (cf. FIG. 1).

In the first preliminary washer (1), the acid issuing from the second washer (2) is recirculated by pumping without being cooled so that it assumes a temperature of from 100 to 140° C, the gas leaving the washer (1) with a temperature of from 90 to 160° C. The slightly impure concentrated $H_2SO_4$ (6) issuing from the residual gas washer following the condensation stages enters the second preliminary washer (2) where it is recirculated by pumping via a water cooler (2b), the acid being cooled to a temperature of from 40 to 70° C. The HF issues from the second preliminary washer (2) with temperatures of from 50 to 90° C. The preliminary $H_2SO_4$ washers (1, 2) are followed by a first indirect water cooler (14), a direct HF-washer for further purification and precooling of the HF-gases. Subsequent condensation takes place in a second water cooler and following brine coolers. The HF- and $SiF_4$-containing gases issuing from the condensation stages are further purified with concentrated sulphuric acid in a residual gas washer, followed by further processing in the form of $H_2SiF_6$. The HF-washer consists of a direct HF-cooling stage which is fed with liquid HF from the condensation stages in such a way that all the liquid HF introduced just evaporates.

The washing acid (1a) issuing from the preliminary $H_2SO_4$ washers is combined with the condensates from the first indirect $H_2O$ cooler and the HF washer, followed by the addition of oleum. The resulting product is delivered as charging acid to the reaction furnace.

A concentrated 99.95% pure HF, which still contains up to 0.001% of $H_2SO_4$, is obtained by this process according to British Pat. No. 1,414,748.

Both for reasons of pollution control and also for the potential value of the end products, there is advantage to be gained in further improving the process with a view to obtaining a purer end product and waste gases laden to a lesser extent with reactive gases.

One critical parameter of the process described above is the water content of the sulphuric acid and the reaction gases:

In the reaction of fluorite with sulphuric acid, it is necessary, in order to ensure a smooth reaction, to maintain a certain water content in the charging acid. The reaction of sulphuric acid or hydrofluoric acid with the oxygen-containing impurities in the fluorite (for example $SiO_2$, $Fe_2O_3$, $CaCO_3$) gives rise to the formation of more water so that the crude HF gases formed enter the first purification stage with different water contents, depending upon the quality of the fluorite. With low water contents in the crude HF gas, the water content in the washing acid of the preliminary $H_2SO_4$ washer falls to such an extent that the gas leaving the preliminary $H_2SO_4$ washer entrains with it considerable quantities of $H_2SO_4$ which can no longer be completely removed in the HF-washer.

Another critical parameter is the fact that $CaSO_4$ gradually crystallizes out on the packing in the first part of the $H_2SO_4$ washer. This ultimately brings the installation to a standstill and necessitates involved repair work for replacing the packing.

It has now been found that the difficulties referred to above can be avoided, firstly, if instead of the total amount of sulphuric acid (washing acid from the residual gas washer), being introduced in countercurrent into the preliminary washer 1 by way of the prewasher 2, the acid is distributed beforehand between both preliminary washers, and, secondly, if instead of the total amount of oleum required for adjusting the charging acid being introduced into the washing acids from the preliminary $H_2SO_4$ wash which are combined with the condensates of the following stage, the oleum is actually added in portions to the washing circuit of the first preliminary $H_2SO_4$ washer.

By virtue of these measures, the water content in the second preliminary washer can be raised to such an extent that a hydrogen fluoride with very low $H_2SO_4$ content is obtained. At the same time, the water content in the first preliminary washer is reduced.

Furthermore, it has surprisingly been found that by this method, hardly any calcium sulphate crystallizes out.

Optimum conditions are obtained when the distribution of oleum and sulphuric acid between the preliminary washers is arranged such that the water content in the washing acids of each of the two preliminary washers is kept in a range of about 6 to 10% by weight.

The preliminary sulphuric acid washer is then followed in known manner by HF washers, water coolers and brine coolers for condensing the purified gases. The residual gases (substantially $SiF_4$-containing inert gases which still contain a little HF) are washed with concentrated sulphuric acid and further processed in the form of $H_2SiF_6$.

Accordingly, the present invention provides a process for obtaining highly pure concentrated hydrofluoric acid by purifying crude HF gases obtained from the reaction of fluorite with sulphuric acid in at least two preliminary $H_2SO_4$ washing stages, followed by an HF-wash, water coolers, at least two brine coolers and an $H_2SO_4$ residual gas wash, through which the entire quantity of sulphuric acid required for reaction with the fluorite, including the quantity of oleum additionally used, is passed, characterized by the fact that this sulphuric acid is subsequently introduced into the two preliminary $H_2SO_4$ washing circuits, together with part of the quantity of oleum required for adjusting the charging acid, in such proportions that the water content in each of the two washing circuits is kept in the range from 6 to 10% by weight.

This is preferably carried out by introducing into the washing circuit of the second $H_2SO_4$ washer about 25 to 75%, and most preferably about 40 to 60%, and into the washing circuit of the first washer about 25 to 75%, and most preferably about 40 to 60% of the total quantity of sulphuric acid used, by introducing the overflow from the second $H_2SO_4$ washer into the washing circuit of the first $H_2SO_4$ washer and by additionally introducing into the washing circuit of the first $H_2SO_4$ washer about 25 to 100% and most preferably about 50 to 75% of the quantity of oleum required for adjusting the charging acid.

In cases where the water contents of the crude gases are subject to considerable fluctuations, the water content of the washing acids may be checked at regular intervals, for example hourly, according to the homogeneity of the fluorite used, and the distribution of acid regulated accordingly.

The sulphuric acid used is preferably introduced into the preliminary washers in a ratio of about 50 : 50 and the water content of the washing circuits regulated by the quantity of oleum additionally introduced into the first washer.

A hydrogen fluoride with a very low $H_2SO_4$ content, of the order of a few ppm, is obtained by the process according to the invention, in addition to which the service life of the installation is considerably lengthened. For example, in an installation operated in accordance with the present invention, the packing in the $H_2SO_4$ washers did not show any sign of requiring replacement even after continuous operation for 6 months.

BRIEF DESCRIPTION OF THE DRAWINGS

The process according to the invention is described in more detail in the following with reference to the accompanying drawings, wherein.

Figure 1:
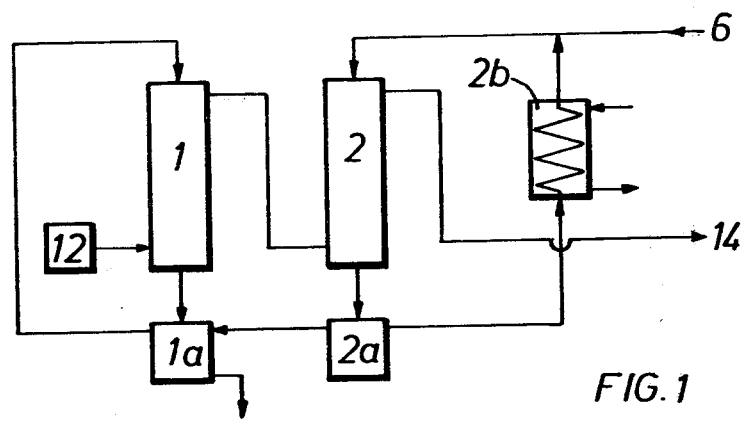
FIG. 1 is a flow diagram which illustrates the already known process.
Figure 2:
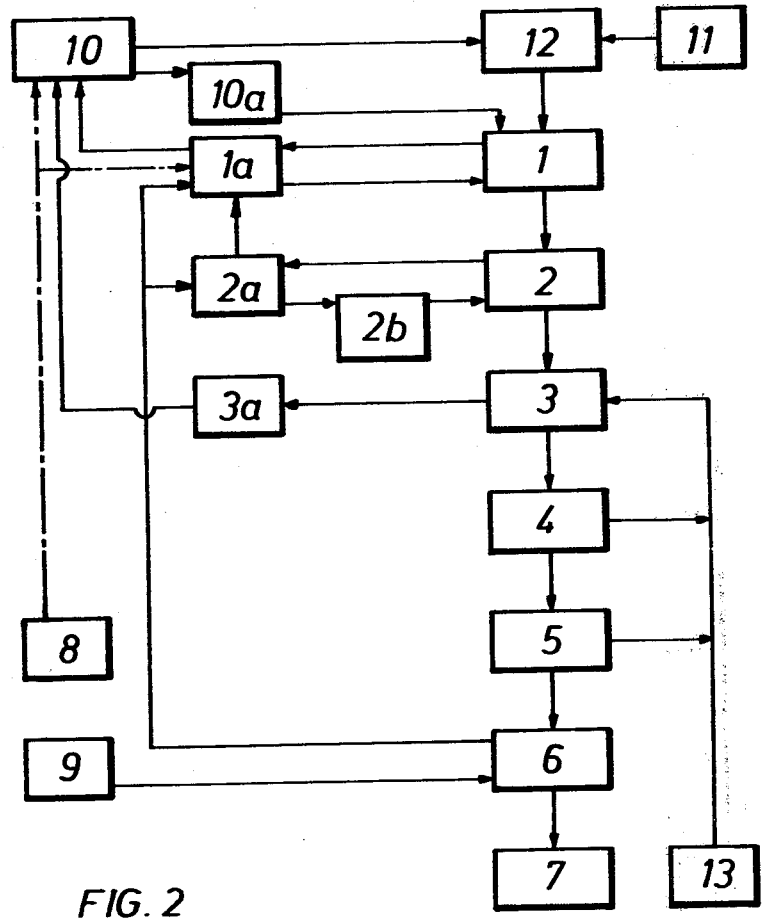
FIG. 2 is a flow diagram which illustrates the process according to the present invention.

The references used denote analogous functions for both processes. The meanings of the individual references used are as follows:

1 first sulphuric acid washer
1a washing acid of the first $H_2SO_4$ washer
2 second $H_2SO_4$ washer
2a washing acid of the second $H_2SO_4$ washer
2b water cooler for washing acid of the second $H_2SO_4$ washer
3 HF washer
3a condensate of the HF washer
4 indirect water cooler for prepurified HF gases
5 brine cooler
6 $H_2SO_4$ residual gas washer
7 $H_2SiF_6$ further processing
8 oleum
9 concentrated $H_2SO_4$
10 charging acid
10a HF-containing gases evolved from the charging acid
11 fluorite
12 reaction furnace
13 concentrated HF
14 indirect water cooler for prepurified HF-gases The process according to the invention is described in detail in the following with reference to FIG. 2;

The crude gases leaving the reaction furnace (12) with a temperature of approximately 150 to 250° C. are largely freed from dust-form compounds ($CaSO_4$, $CaF_2$) and substantially non-volatile gaseous compounds ($H_2SO_4$, $H_2O$) in the first sulphuric acid washer (1). The washer (1) is sprayed from the receiver (1a) through a pump-operated circuit. In the second sulphuric acid washer (2), the prepurified gas is further cooled to approximately 50–110° C. and freed from remaining dust particles and other substantially non-volatile gaseous compounds. The second washer (2) is sprayed from the receiver (2a) through a pump-operated circuit. For cooling the washing acid, a water cooler (2b) is incorporated into the circuit. The gases thus prepurified then enter the reservoir for liquid HF (13) through the HF washer (3) after condensation in an $H_2O$-cooler (4) and two or more brine coolers (5). The residual gases issuing from the condensation stages (4, 5) enter the $H_2SiF_6$ further processing stage (7) after a sulphuric acid residual gas wash (6).

The acid overflowing from the receiver of the second sulphuric acid washer (2a), together with 25 to 75% of the stoichiometric quantity of concentrated sulphuric acid (9), taking into account the quantity of oleum additionally used, coming from the residual gas washer (6) for the reaction (12) with the fluorite (11) and 25 to 100% of the quantity of oleum (8) required for adjusting the water content of the charging acid (10), are introduced into the receiver (1a) for the washing acid of the first sulphuric acid washer (1).

The remaining 25 to 75% of the sulphuric acid coming from the residual gas washer (6) are introduced into the receiver (2a) for the washing acid of the second sulphuric acid washer (2).

The charging acid (10) is adjusted with the overflow from the receiver of the first sulphuric acid washer (1a) and with the condensate (3a) of the HF washer (3) together with the rest of the oleum (8). The HF-containing gases (10a) evolved are returned to the first sulphuric acid washer (1).

The HF-washer (3) is preferably operated with liquid HF (13) in such a way that all the HF used just evaporates.

After passage through washers (1) and (2) there are removed from the crude gases most of the dust, most of the water and the $SO_3$ contained therein. The HF washer (3) removes part of the remaining dust and water. The remaining dust and water are removed from the water cooler (4) and brine coolers (5) while the residual gas washer (6) serves to remove any impurities which may still be left in the gas.

The invention will be further described in the following illustrative example wherein all parts are by weight unless otherwise expressed.

EXAMPLE

The crude HF gases, which contain $H_2O$, $SO_2$, $SiF_4$, S and dust ($CaF_2$, $CaSO_4$) leave the reaction furnace (12) with a temperature of 190° C. and enter the first sulfuric acid washer (1) which is sprayed with pump-recirculated washing acid from the receiver (1a). The volume of the crude gases is about 3800 m$^3$/h and that of the of the wash liquids about 10 – 20 m$^3$/m$^2$h. It is mainly dust-form $CaSO_4$, $H_2SO_4$-droplets and also $SO_3$- and $H_2O$-vapors which are separated off in the first washer (1). The HF gas then enters the second $H_2SO_4$ washer (2) with a temperature of 140° C. The second $H_2SO_4$ washer (2) is sprayed with pump-recirculated washing acid from the receiver (2a) by way of the water cooler (2b). The HF-gas leaves the washer with a temperature of 90° C., is delivered to the HF-washer (3) for further purification and cooling and subsequently condensed in several stages.

50% of the total quantity of sulphuric acid used (98% $H_2SO_4$) is introduced into each of the washer receivers (1a, 1b). The sulphuric acid was previously used for washing the residual gases (6) and therefore already contains HF and has a temperature of 35° C. In addition to 50% of the sulphuric acid, the overflow from the washer receiver (2a) and 50% of the total quantity of oleum (8) (20%) used are introduced into the washer receiver (1a).

The charging acid is prepared in the mixing vessel (10) from the overflow from the receiver (1a), the condensate (3a) from (3) and the remaining 50% of the oleum (8). The charging acid flows off to the furnace at a temperature of 120° C.

The water content in the first $H_2SO_4$ washer (1a) is substantially equal to the water content in the washing acid of the second $H_2SO_4$ washer (2a) and amounts to between 7% and 9%. In the first $H_2SO_4$ washer, no deposits of $CaSO_4$ are observed even after operation for several months. The hydrogen fluoride condensed out contains approximately 0.0005% of $H_2SO_4$.

It will be appreciated that the instant specification and examples are set forth by way of illustration and not limitation, and that various modifications and changes may be made without departing from the spirit and scope of the present invention.

What is claimed is:

1. A process for the production of highly pure concentrated hydrofluoric acid by purifying crude HF gas containing $H_2O$, $SO_2$, S, $CaF_2$, $H_2SO_4$ and $CaSO_4$ and obtained in the reaction of fluorite and sulphuric acid, comprising
   (a) passing the crude gas at a temperature of about 150 to 250° C. through two $H_2SO_4$ washing circuits each supplied with about 25 to 75% of the total $H_2SO_4$ supplied to both, thereby removing most of the dust, water and $SO_3$,
   (b) passing the gas through an HF-wash, thereby removing part of the remaining dust and water,
   (c) passing the gas through a water cooler and at least two brine coolers thereby to remove the last part of the dust and water and to condense the HF which, now-liquid highly pure concentrated HF, is collected,
   (d) passing the residual gas through an $H_2SO_4$ wash, thereby removing the balance of the impurities,
   (e) supplying to (d) the entire quantity of sulphuric acid required for reaction with the fluorite including a quantity of oleum additionally used for adjusting the $H_2SO_4$ concentration, and
   (f) introducing into (a) the $H_2SO_4$ previously employed in (d) together with part of the quantity of oleum required for adjusting the charging acid concentration in such proportions that the water content in each of the two washing circuits of (a) is kept in the range of about 6 to 10% by weight, about 25 to 100% of the oleum introduced being supplied to the first circuit of (a), Whereby the HF which results has an $H_2SO_4$ content of the order of a few ppm, there are substantially no deposits of $CaSO_4$ in the first $H_2SO_4$ washing circuit and the service life of the system is considerably lengthened.

2. A process as claimed in claim 1, wherein about 50% of the total quantity of sulphuric acid used is introduced into the washing circuits of each of the two preliminary sulphuric acid washers of (a), and the water content in the washing circuits is adjusted by regulating the proportion introduced into the first $H_2SO_4$ washing circuit of the quantity of oleum required for adjusting the charging acid.

3. A process as claimed in claim 1, wherein the acid is added to the washing circuits of (a) at a substantially constant rate and concentration, and at least one of the rate and concentration is periodically changed and then maintained to keep the water contents within the indicated range.

* * * * *